(12) United States Patent
Ozone

(10) Patent No.: US 11,405,542 B2
(45) Date of Patent: Aug. 2, 2022

(54) IMAGE PICKUP CONTROL DEVICE, IMAGE PICKUP DEVICE, AND IMAGE PICKUP CONTROL METHOD

(71) Applicant: SONY SEMICONDUCTOR SOLUTIONS CORPORATION, Kanagawa (JP)

(72) Inventor: Takayoshi Ozone, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 576 days.

(21) Appl. No.: 16/325,102

(22) PCT Filed: May 17, 2017

(86) PCT No.: PCT/JP2017/018461
§ 371 (c)(1),
(2) Date: Feb. 12, 2019

(87) PCT Pub. No.: WO2018/042770
PCT Pub. Date: Mar. 8, 2018

(65) Prior Publication Data
US 2021/0289137 A1 Sep. 16, 2021

(30) Foreign Application Priority Data
Sep. 1, 2016 (JP) .............................. JP2016-171049

(51) Int. Cl.
*H04N 5/232* (2006.01)
*G06T 3/00* (2006.01)
*H04R 5/04* (2006.01)

(52) U.S. Cl.
CPC ........... *H04N 5/232* (2013.01); *G06T 3/0018* (2013.01); *H04N 5/23251* (2013.01);
(Continued)

(58) Field of Classification Search
CPC ........... H04N 5/23238; H04N 5/23251; H04N 5/232939; H04R 1/10; H04R 1/406
See application file for complete search history.

(56) References Cited

U.S. PATENT DOCUMENTS 7,511,756 B2 * 3/2009 Kawai ................ H04N 5/23254
 348/335
7,834,907 B2 * 11/2010 Kawai ................ H04N 5/23238
 348/208.4
(Continued)

FOREIGN PATENT DOCUMENTS

CN 104247395 A * 12/2014 ........... G06T 3/0056
JP 08-191419 A 7/1996
(Continued)

OTHER PUBLICATIONS

International Search Report and Written Opinion of PCT Application No. PCT/JP2017/018461, dated Jun. 20, 2017, 10 pages of ISRWO.

*Primary Examiner* — John Villecco
(74) *Attorney, Agent, or Firm* — Chip Law Group

(57) ABSTRACT

To simplify a configuration of an image pickup device that performs an output of an image signal and an audio signal in a partial area of an image pickup area. An image pickup control device includes a display area update unit and a localization audio signal generation unit. The display area update unit updates a position in a frame of a display area which is an area used for display among the frames including an image signal output from an image pickup element in accordance with a motion of an image pickup device in which the image pickup element is disposed. The localization audio signal generation unit generates a localization audio signal which is an audio signal for localizing an audio (Continued)

image in the updated display area on the basis of audio signals output from a plurality of microphones.

7 Claims, 9 Drawing Sheets

(52) U.S. Cl.
CPC ......... *H04N 5/232939* (2018.08); *H04R 5/04* (2013.01); *H04R 2499/11* (2013.01)

(56) References Cited

U.S. PATENT DOCUMENTS

| | | | | |
|---|---|---|---|---|
| 8,249,305 | B2* | 8/2012 | Kondo | H04N 21/440263 |
| | | | | 382/107 |
| 9,509,903 | B2* | 11/2016 | Kinoshita | G06V 20/52 |
| 9,570,113 | B2* | 2/2017 | Campbell | H04N 9/8211 |
| 9,826,211 | B2* | 11/2017 | Sawa | H04N 5/2252 |
| 10,056,115 | B2* | 8/2018 | Campbell | H04N 5/23238 |
| 10,244,219 | B2* | 3/2019 | Sawa | H04N 9/802 |
| 10,410,680 | B2* | 9/2019 | Campbell | H04N 5/77 |
| 10,536,681 | B2* | 1/2020 | Sawa | H04R 27/00 |
| 10,573,351 | B2* | 2/2020 | Campbell | H04N 9/8211 |
| 10,679,676 | B2* | 6/2020 | Campbell | H04N 5/77 |
| 10,802,286 | B2* | 10/2020 | Byun | H04N 5/23258 |
| 10,810,789 | B2* | 10/2020 | Kim | G06F 3/1454 |
| 2009/0116652 | A1* | 5/2009 | Kirkeby | H04S 7/303 |
| | | | | 381/1 |
| 2009/0185028 | A1* | 7/2009 | Ogawa | G08B 13/19695 |
| | | | | 348/36 |
| 2012/0218377 | A1* | 8/2012 | Oku | H04R 1/406 |
| | | | | 348/36 |
| 2013/0083944 | A1* | 4/2013 | Kvist | H04R 3/005 |
| | | | | 381/92 |
| 2013/0177168 | A1* | 7/2013 | Inha | H04N 21/4223 |
| | | | | 381/92 |
| 2013/0321568 | A1* | 12/2013 | Suzuki | H04N 5/23238 |
| | | | | 348/36 |
| 2014/0218470 | A1* | 8/2014 | Rondinelli | H04N 5/04 |
| | | | | 348/36 |
| 2015/0350621 | A1* | 12/2015 | Sawa | H04N 21/23412 |
| | | | | 386/201 |
| 2016/0005435 | A1* | 1/2016 | Campbell | G11B 27/3081 |
| | | | | 386/240 |
| 2017/0019744 | A1* | 1/2017 | Matsumoto | G06K 9/00771 |
| 2017/0110155 | A1* | 4/2017 | Campbell | H04N 5/23238 |
| 2018/0115759 | A1* | 4/2018 | Sawa | H04N 5/2252 |
| 2018/0115760 | A1* | 4/2018 | Sawa | H04R 3/005 |
| 2018/0160045 | A1* | 6/2018 | Yu | G06T 5/006 |
| 2019/0005987 | A1* | 1/2019 | Campbell | H04N 9/8211 |
| 2019/0325915 | A1* | 10/2019 | Campbell | H04N 9/806 |
| 2020/0135238 | A1* | 4/2020 | Campbell | H04N 5/77 |
| 2020/0192099 | A1* | 6/2020 | Byun | H04N 5/23258 |

FOREIGN PATENT DOCUMENTS

| | | | |
|---|---|---|---|
| JP | 08-307753 A | | 11/1996 |
| JP | 2007-143052 A | | 6/2007 |
| JP | 2012-119803 A | | 6/2012 |
| JP | 2016181913 A | * | 10/2016 |
| WO | WO-2017149124 A1 | * | 9/2017 ........... G11B 27/031 |

* cited by examiner

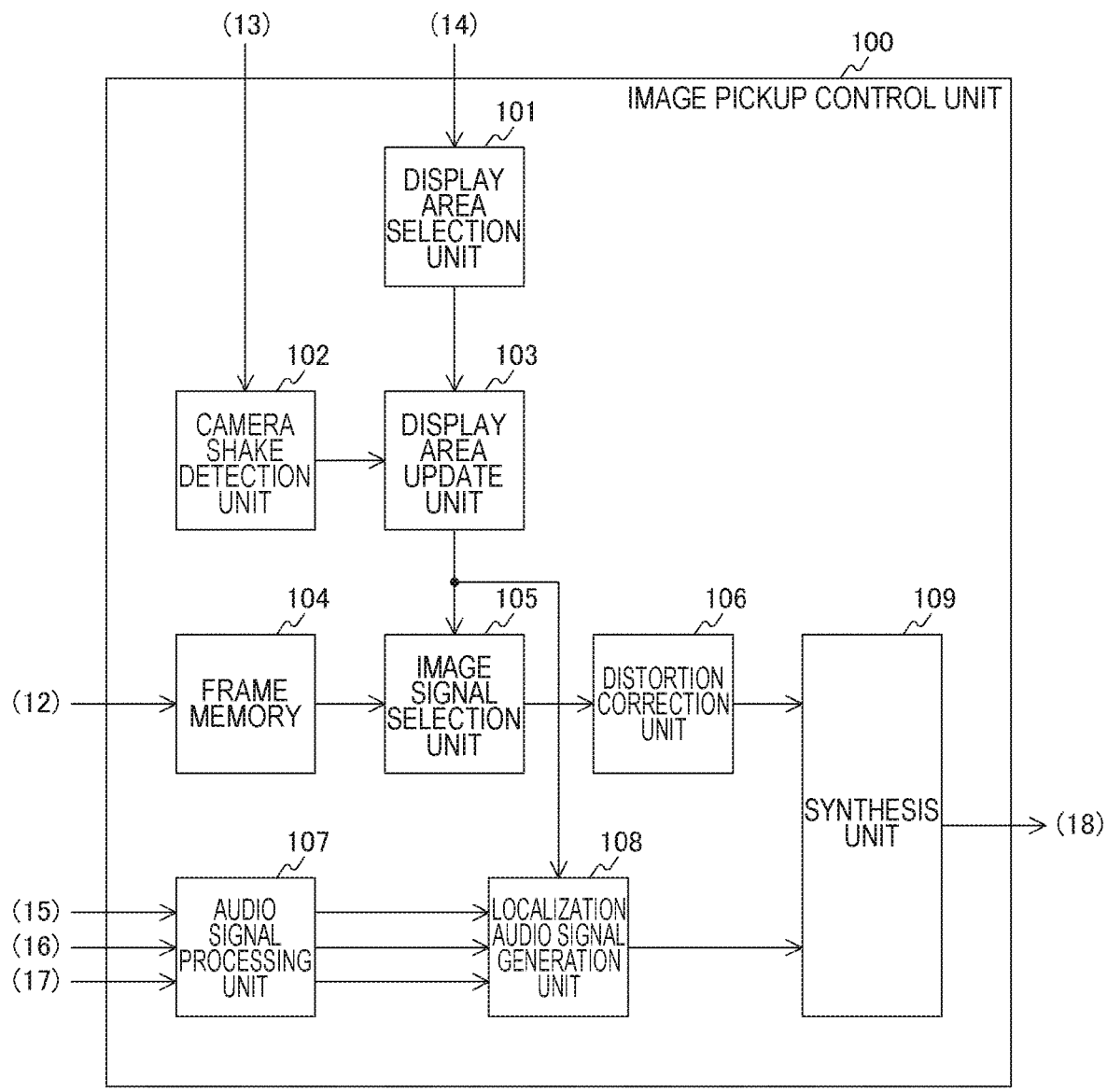

FIG. 5
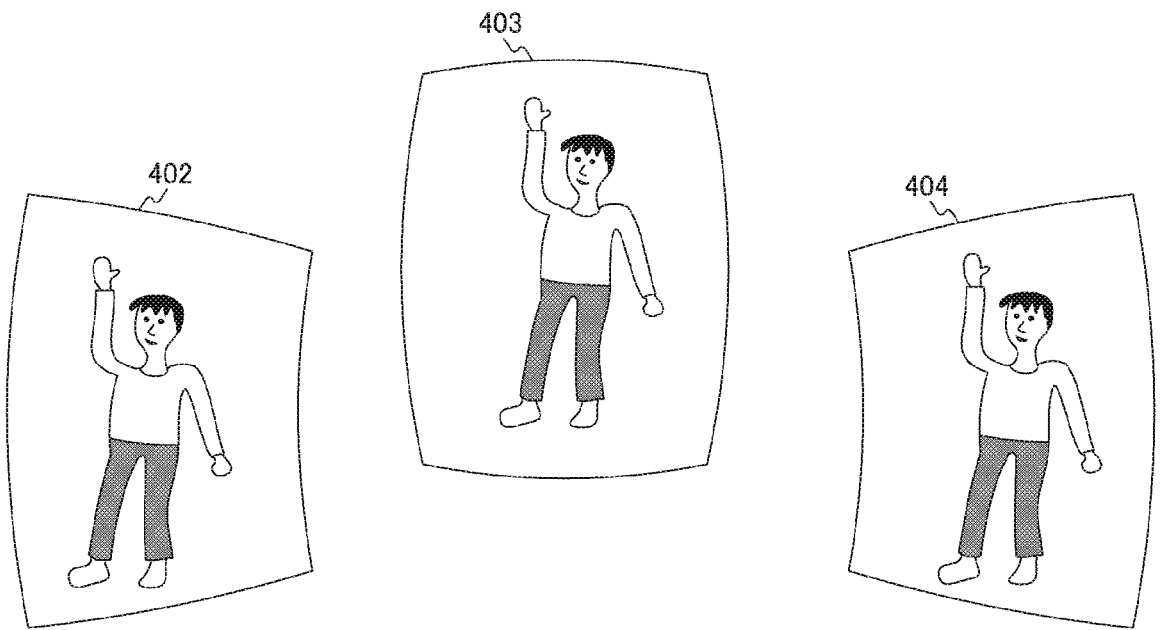
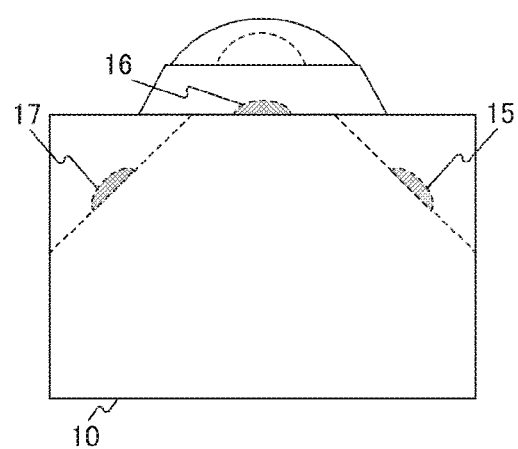

FIG. 6

| DISPLAY AREA | | GAIN | | |
|---|---|---|---|---|
| | | A | B | C |
| 402 | RIGHT CHANNEL | 0.2 | 0.8 | 0 |
| | LEFT CHANNEL | 0 | 0 | 1.0 |
| 403 | RIGHT CHANNEL | 1.0 | 0 | 1.0 |
| | LEFT CHANNEL | 1.0 | 0 | 1.0 |
| 404 | RIGHT CHANNEL | 1.0 | 0 | 0 |
| | LEFT CHANNEL | 0 | 0.8 | 0.2 |

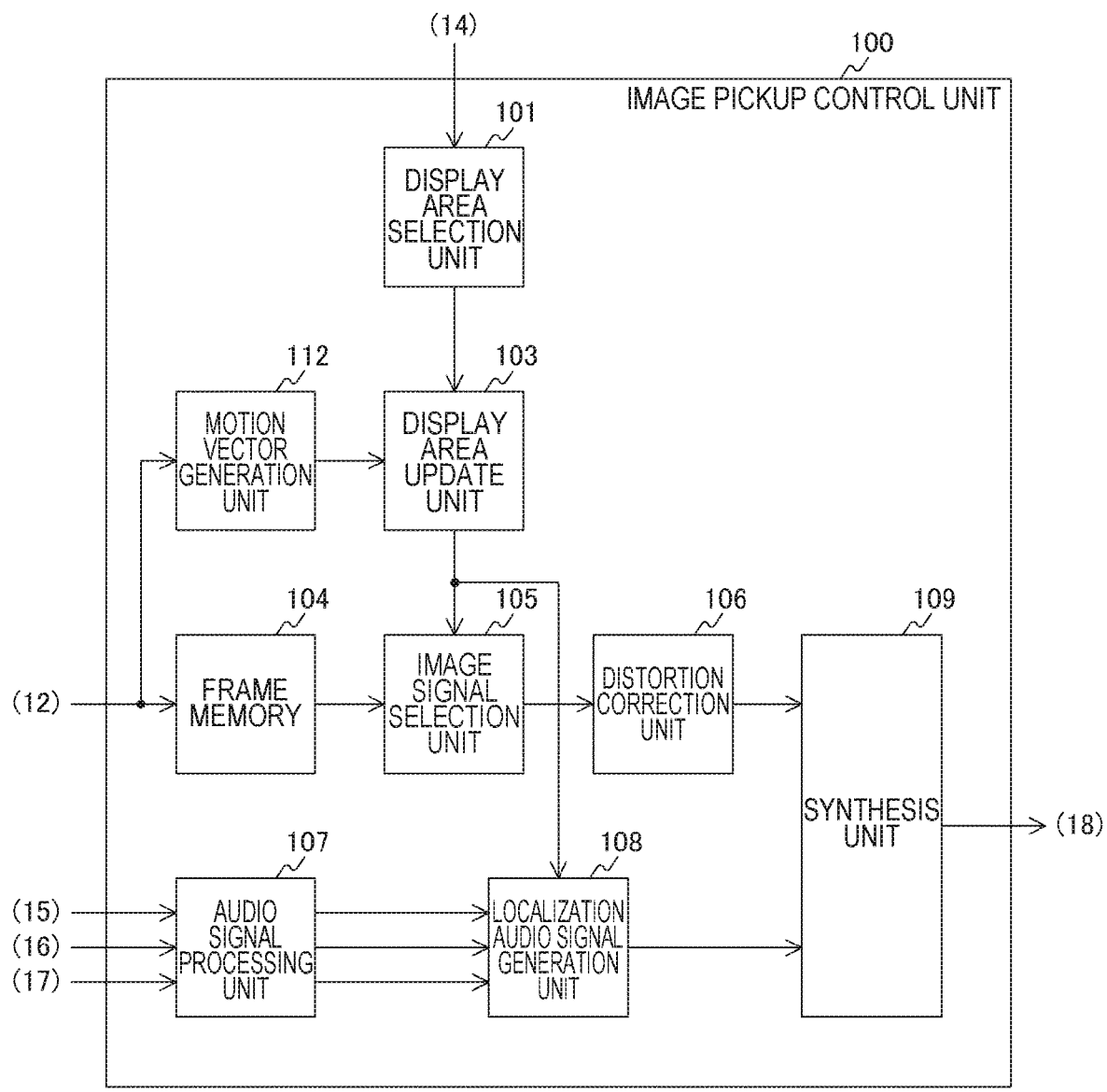

IMAGE PICKUP CONTROL DEVICE, IMAGE PICKUP DEVICE, AND IMAGE PICKUP CONTROL METHOD

CROSS REFERENCE TO RELATED APPLICATIONS

This application is a U.S. National Phase of International Patent Application No. PCT/JP2017/018461 filed on May 17, 2017, which claims priority benefit of Japanese Patent Application No. JP 2016-171049 filed in the Japan Patent Office on Sep. 1, 2016. Each of the above-referenced applications is hereby incorporated herein by reference in its entirety.

TECHNICAL FIELD

The present technology relates to an image pickup control device, an image pickup device, and an image pickup control method, and particularly to an image pickup control device, an image pickup device, and an image pickup control method for outputting an image signal in a partial area of an image pickup area.

BACKGROUND ART

In the related art, an image pickup device including a microphone for collecting audio, capturing a moving image, acquiring the audio, and adding the audio to the moving image, thereby improving convenience has been used. For example, a system in which a plurality of microphones is disposed around a subject such as a person in a video conference camera system or the like and an image pickup device is panned to photograph a speaker among the subjects has been proposed (for example, refer to Patent Literature 1). In the system, an audio signal for localizing an audio image to the speaker is generated by mixing the audio signals collected by the plurality of microphones and output.

CITATION LIST

Patent Literature

Patent Literature 1: JP 2007-143052A

DISCLOSURE OF INVENTION

Technical Problem

In the above-described related art, a mechanism for rotating the image pickup device for panning is required. In addition, it is necessary to dispose a plurality of microphones around the subject. Therefore, the above-described prior art has a problem that a configuration of the system becomes complicated.

The present technology has been made in view of such a situation and an object of the present technology is to simplify a configuration of an image pickup device that performs an output of an image signal and an audio signal in a partial area of an image pickup area.

Solution to Problem

The present technology has been made to solve the above problem. According to a first aspect of the present technology, there is provided an image pickup control device and an image pickup control method. The image pickup control device includes: a display area update unit configured to update a position in a frame of a display area which is an area used for display among frames including an image signal output from an image pickup element in accordance with a motion of an image pickup device in which the image pickup element is disposed; and a localization audio signal generation unit configured to generate a localization audio signal which is an audio signal for localizing an audio image in the updated display area on the basis of audio signals output from a plurality of microphones. Therefore, there is an effect that the audio signal for localizing the audio image is generated in the display area updated according to the motion of the image pickup device.

In addition, according to the first aspect, the localization audio signal generation unit may generate the localization audio signal by mixing the audio signals output from the plurality of microphones. Therefore, there is an effect that the localization audio signal is generated by mixing the plurality of audio signals.

In addition, according to the first aspect, the image pickup control device may further include a correction unit configured to correct a distortion of the image signal in the corrected display area. Therefore, there is an effect that an image signal of which distortion is corrected is output.

In addition, according to the first aspect, the image pickup element may output the image signal captured through a fish-eye lens, and the correction unit may correct the distortion of the image signal by the fish-eye lens. Therefore, there is an effect that the distortion by the fish-eye lens is corrected.

In addition, according to the first aspect, the image pickup control device may further include a motion detection unit configured to detect the motion of the image pickup device, and the display area update unit may update the display area in accordance with the motion of the image pickup device detected by the motion detection unit. Therefore, there is an effect that the motion of the image pickup device is detected by the motion detection unit.

In addition, according to the first aspect, the motion detection unit may detect the motion of the image pickup device on the basis of an output from a sensor that detects the motion of the image pickup device. Therefore, there is an effect that the motion of the image pickup element is detected by the output from the sensor.

In addition, according to the first aspect, the motion detection unit may detect the motion of the image pickup device on the basis of a motion vector generated from the image signal output from the image pickup device. Therefore, there is an effect that the motion of the image pickup device is detected by the motion vector.

In addition, according to a second aspect, an image pickup device includes: an image pickup element; a display area update unit configured to update a position in a frame of a display area which is an area used for display among frames including an image signal output from the image pickup element in accordance with a motion of the image pickup device in which the image pickup element is disposed; and a localization audio signal generation unit configured to generate a localization audio signal which is an audio signal for localizing an audio image in the updated display area on the basis of audio signals output from a plurality of microphones. Therefore, there is an effect that the audio signal for localizing the audio image is generated in the display area updated according to the motion of the image pickup device.

Advantageous Effects of Invention

According to the present technology, it is possible to achieve an excellent effect of simplifying a configuration of an image pickup device that performs an output of an image signal and an audio signal in a partial area of an image pickup area. Note that the effects described herein are not necessarily limitative and any of the effects described in the present disclosure may be applied.

BRIEF DESCRIPTION OF DRAWINGS

FIG. 2 is a diagram illustrating a configuration example of an image pickup control unit 100 according to a first embodiment of the present technology.

FIG. 5 is a diagram illustrating a relationship between a display area and a microphone according to the embodiment of the present technology.

FIG. 6 is a diagram illustrating an example of a gain of an audio signal according to the embodiment of the present technology.

FIG. 9 is a diagram illustrating a configuration example of the image pickup control unit 100 according to a second embodiment of the present technology.

MODE(S) FOR CARRYING OUT THE INVENTION

Hereinafter, an embodiment for implementing the present technology (hereinafter, referred to as an embodiment) will be described. The description will be given in the following sequence.
1. First embodiment (example of case in which motion of image pickup device is detected by sensor)
2. Second embodiment (example of case in which motion of image pickup device is detected by motion vector)
3. Modified example 1. First Embodiment

[Configuration of Image Pickup Device]

Figure 1:
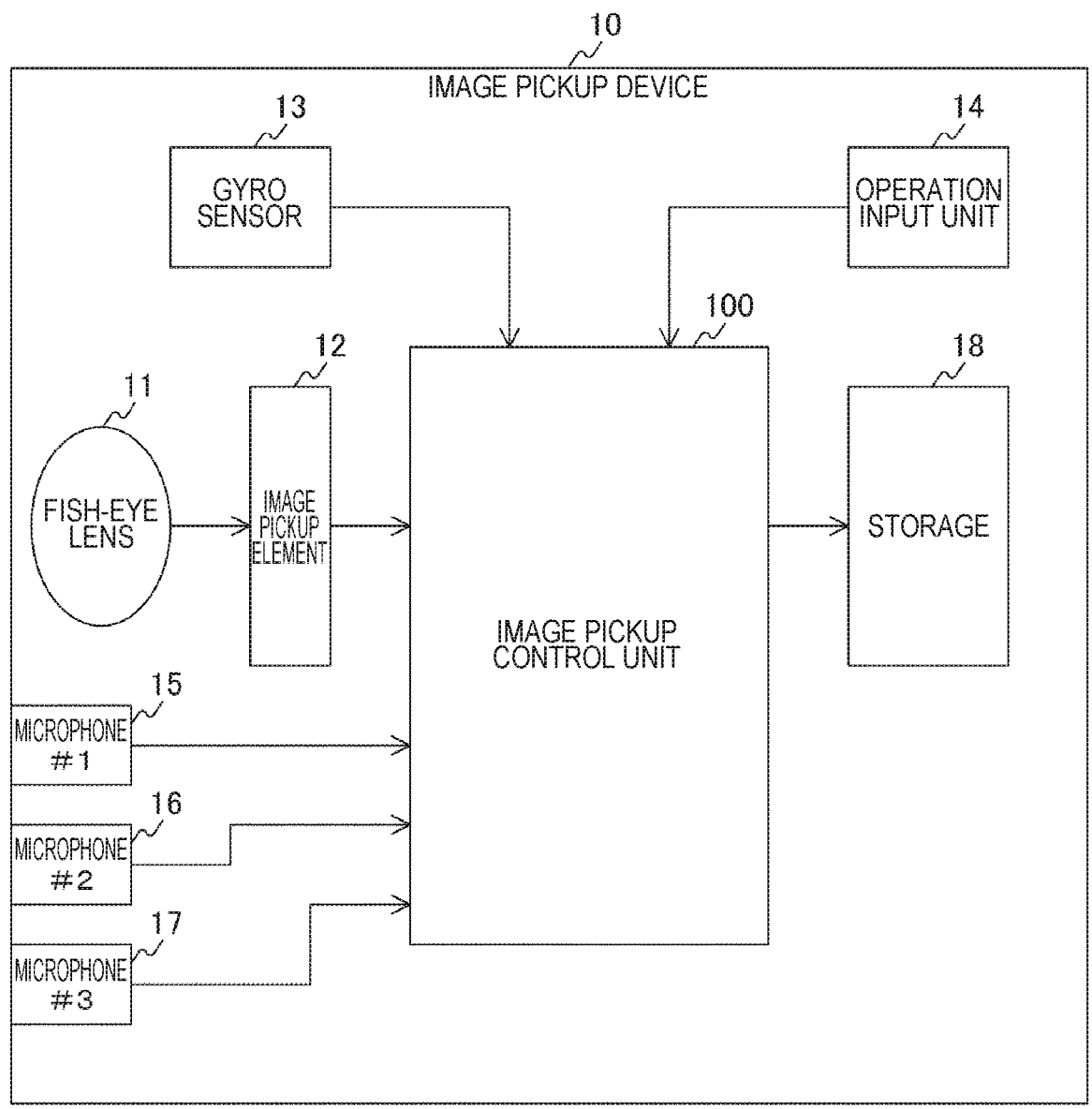
FIG. 1 is a diagram illustrating a configuration example of an image pickup device 10 according to an embodiment of the present technology.

FIG. 1 is a diagram illustrating a configuration example of an image pickup device 10 according to an embodiment of the present technology. The image pickup device 10 includes a fish-eye lens 11, an image pickup element 12, a gyro sensor 13, an operation input unit 14, a microphone #1 (15), a microphone #2 (16), a microphone #3 (17), an image pickup control unit 100, and a storage 18.

The fish-eye lens 11 forms an image on the image pickup element 12. The fish-eye lens 11 is a projection type lens which is not of a central projection type and is a lens which forms an image of a wide viewing angle.

The image pickup element 12 captures the image formed by the fish-eye lens 11. Since the image is captured through the fish-eye lens 11, the captured image is a wide viewing angle image. The image pickup element 12 outputs a frame which is an image signal for one screen to the image pickup control unit 100.

The gyro sensor 13 detects an angular velocity on a predetermined axis of the image pickup device 10 when the image pickup device 10 moves. The gyro sensor 13 outputs the detected angular velocity to the image pickup control unit 100.

The microphones #1 (15) to #3 (17) collect audio from a subject such as a person, convert the audio to an audio signal, and output the audio signal to the image pickup control unit 100. The microphones #1 (15) to #3 (17) are disposed at positions away from each other. Therefore, the output audio signals become signals of phases different from each other, and an audio field is able to be three-dimensional. In addition, microphones having directivity may be used as the microphones #1 (15) to #3 (17) and the microphones #1 (15) to #3 (17) are able to be disposed in audio collection ranges different from each other. Details of the disposition of the microphones #1 (15) to #3 (17) will be described later.

The image pickup control unit 100 controls the entire image pickup device 10. The image pickup control unit 100 selects an image signal of a display area which is an area used for display among frames output from the image pickup element 12, and outputs the image signal to the storage 18. As described above, the image captured by the image pickup element 12 is a wide viewing angle image. The image pickup control unit 100 sets a display area for a wide viewing angle image and outputs only the image signal of the display area. Therefore, it is possible to omit a process of the image signal in an area other than the display area, and simplifying the process and reducing power consumption of the image pickup device 10 are possible. In addition, it is possible to reduce a file size of the image signal when the image signal is stored in the storage 18 which will be described later.

In addition, the image pickup control unit 100 updates a position in the frame of the display area according to the motion of the image pickup device 10 detected by the above-described gyro sensor 13. In addition, the image pickup control unit 100 performs a process on the audio signals output from the microphones #1 (15) to #3 (17), and outputs the audio signals to the storage 18 together with the image signal of the display area. As the process, the image pickup control unit 100 performs a process of generating an audio signal for localizing the audio image in the display area from the audio signals output from the microphones #1 (15) to #3 (17). A displayed screen and the audio image are able to be made to coincide by adding the audio signal to the image signal. Details of a configuration of the image pickup control unit 100 will be described later. Note that the image pickup control unit 100 is an example of an image pickup control device described in the claims.

The storage 18 stores the image signal and the audio signal output from the image pickup control unit 100.

The operation input unit 14 receives an input of the display area by a user such as a photographer. The operation input unit 14 outputs the received display area to the image pickup control unit 100. As the operation input unit 14, for example, a display device with a touch panel is able to be used. An image of a frame imaged by the image pickup element 12 is displayed on the display device, and the photographer can select the display area while viewing the display of the display device and perform an input by the touch panel.

Note that the configuration of the image pickup device 10 is not limited to this example. For example, it is also possible to use a central projection type wide angle lens instead of the fish-eye lens 11. In addition, it is also possible to detect the motion of the image pickup device 10 by using a sensor that detects acceleration instead of the gyro sensor 13. In addition, it is also possible to output the image signal and the audio signal from the image pickup control unit 100 to the outside of the image pickup device 10 in a wired or wireless manner.

[Configuration of Image Pickup Control Unit]

FIG. 2 is a diagram illustrating a configuration example of the image pickup control unit 100 according to the first embodiment of the present technology. The image pickup control unit 100 includes a display area selection unit 101, a camera shake detection unit 102, a display area update unit 103, a frame memory 104, an image signal selection unit 105, a distortion correction unit 106, an audio signal processing unit 107, a localization audio signal generation unit 108, and a synthesis unit 109.

The frame memory 104 stores the image signal output from the image pickup element 12. The frame memory 104 stores the image signal of one frame.

The display area selection unit 101 selects the display area. The display area selection unit 101 outputs a coordinate of the selected display area to the display area update unit 103. As the display area, for example, it is possible to select the display area output from the operation input unit 14. In addition, for example, it is also possible to select a display area set in advance in the image pickup control unit 100. As the display area set in advance, for example, it is possible to adopt an area having a predetermined size in a central portion of the frame. In addition, for example, it is also possible to specify a person who is talking by performing audio recognition and to set an area including the person as the display area. Details of the frame and the display area will be described later.

The camera shake detection unit 102 detects the motion of the image pickup device 10. The camera shake detection unit 102 detects the motion of the image pickup device 10 on the basis of the angular velocity detected by the gyro sensor 13. The detected motion of the image pickup device 10 is output to the display area update unit 103. Note that the camera shake detection unit 102 is an example of a motion detection unit described in the claims.

The display area update unit 103 updates the position of the display area selected by the display area selection unit 101. The display area update unit 103 updates the position in the frame of the display area in accordance with the motion of the image pickup device 10 detected by the camera shake detection unit 102. For example, in a case in which the image pickup device 10 moves upward due to camera shake or the like, the image captured by the image pickup element 12 also moves upward. In this case, the position in the frame of the display area is updated downward. By updating the position in the frame of the display area so as to offset the motion of the image pickup device 10, it is possible to improve image quality by reducing an influence of camera shake or the like. Note that, in a case in which the position of the image pickup device 10 changes greatly, the display area update unit 103 is also able to update a shape by changing the shape in addition to the position of the display area. The display area update unit 103 outputs a coordinate of the updated display area to the image signal selection unit 105 and the localization audio signal generation unit 108.

The image signal selection unit 105 selects the image signal stored in the frame memory 104 and outputs the image signal to the distortion correction unit 106. The image signal selection unit 105 selects the image signal on the basis of the display area output from the display area update unit 103. Specifically, the image signal is selected by reading the image signal included in the display area among the image signals stored in the frame memory 104.

The distortion correction unit 106 corrects distortion of the image signal selected by the image signal selection unit 105. The distortion correction unit 106 outputs the corrected image signal to the synthesis unit 109. As described above, the image pickup element 12 performs image pickup through the fish-eye lens 11. Therefore, the image signal output from the image pickup element 12 becomes distorted. Therefore, the distortion of the image signal is corrected by the distortion correction unit 106. For correction of distortion, a known method, for example, fish-eye distortion correction is able to be used.

The audio signal processing unit 107 processes the audio signals output from the microphones #1 (15) to #3 (17). The process of the audio signal corresponds to, for example, analog-to-digital conversion for converting an analog audio signal into a digital audio signal. The audio signal processing unit 107 outputs each of the processed audio signals to the localization audio signal generation unit 108.

The localization audio signal generation unit 108 generates a localization audio signal from the audio signal output from the audio signal processing unit 107. Here, the localization audio signal is an audio signal for localizing the audio image in the display area. The display area and the audio image are made to coincide by using the localization audio signal. That is, the user of the image pickup device 10 can acquire a direction and a distance of the audio with respect to an audio source in the display area. Therefore, it is possible to improve realism. The localization audio signal generation unit 108 generates the localization audio signal on the basis of the display area output from the display area update unit 103. Since the localization audio signal is generated on the basis of the display area of which the position is updated by the display area update unit 103, even in a case in which the image pickup device 10 moves due to the camera shake or the like, the display area and the audio image are able to be made to be coincide. The localization audio signal generation unit 108 in the same figure generates a stereo type localization audio signal including two audio signals of a right channel and a left channel, and outputs the stereo type localization audio signal to the synthesis unit 109. Details of the generation of the localization audio signal by the localization audio signal generation unit 108 will be described later. Note that a configuration of the localization audio signal generation unit 108 is not limited to this example. For example, the localization audio signal generation unit 108 is able to generate a monaural type localization audio signal. In addition, the localization audio signal generation unit 108 is also able to generate a localization audio signal of the four channels of right front, right rear, left front, and left rear.

The synthesis unit 109 synthesizes the image signal output from the distortion correction unit 106 and the localization audio signal output from the localization audio signal generation unit 108. The synthesis unit 109 outputs the synthesized image signal and audio signal to the storage 18. In addition, the synthesis unit 109 performs a process on the image signal and the audio signal before the synthesis. Specifically, the synthesis unit 109 is able to perform image processing such as gamma correction on the image signal output from the distortion correction unit 106. Thereafter, the synthesis unit 109 performs compression and encoding of the image signal. For example, it is possible to adopt H.264 as a codec for the encoding. On the other hand, the synthesis unit 109 performs compression and encoding of the audio signals of the right channel and the left channel, which are the localization audio signals output from the localization audio signal generation unit 108. For example, it is possible to adopt advanced audio coding (AAC) as a codec to the encoding. The synthesis unit 109 synthesizes the encoded image signal and the encoded audio signal to form a moving image file, and outputs the moving image file to the storage 18.

[Configuration of Image Pickup Control Unit]

Figure 3A:
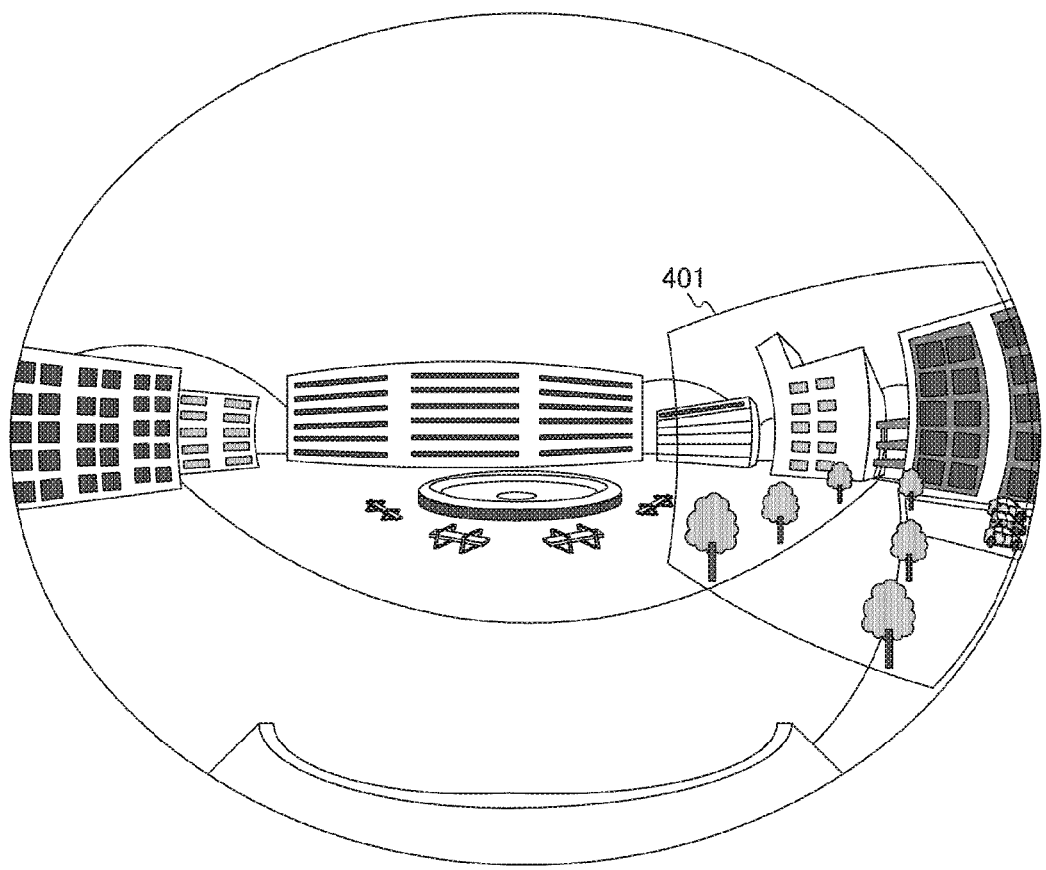
FIGS. 3A and 3B are diagrams illustrating an example of a display area according to the embodiment of the present technology.
Figure 3B:
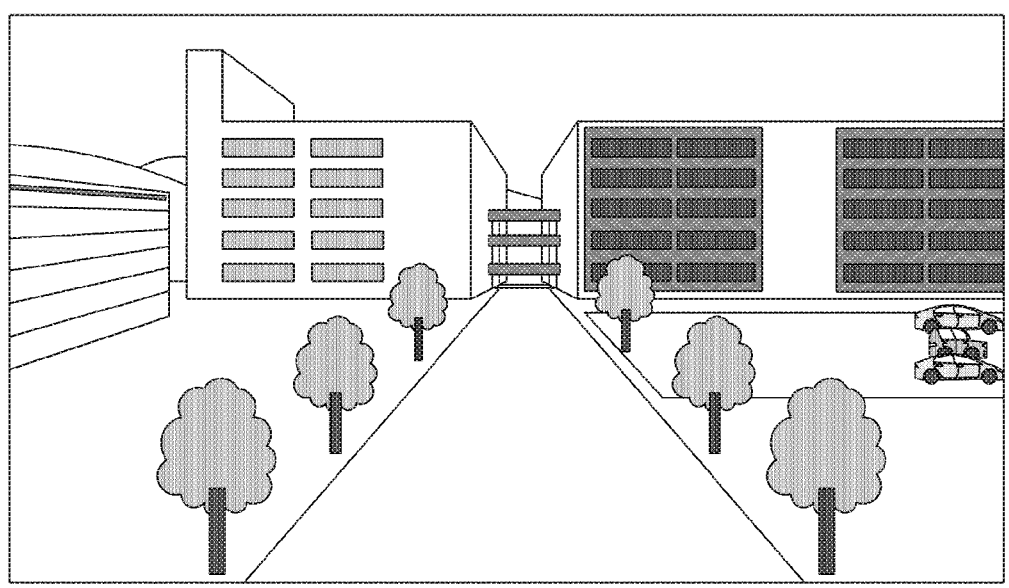

FIGS. 3A and 3B are diagrams illustrating an example of the display area according to the embodiment of the present technology. FIG. 3A represents an image (frame) captured by the image pickup element 12. Since the image is captured through the fish-eye lens 11, the image is a wide viewing angle image. An area 401 of FIG. 3A represents the display area. FIG. 3B is an image obtained by correcting the distortion of the image signal of the display area. It is possible to improve convenience by performing the distortion correction as described above.

[Appearance of Image Pickup Device]

Figure 4A:
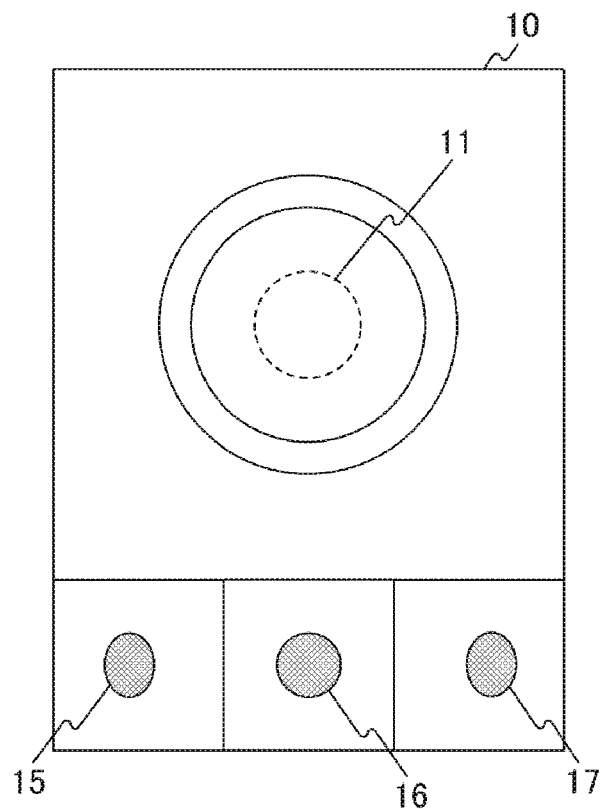
FIGS. 4A and 4B are schematic diagrams illustrating an example of the image pickup device 10 according to the embodiment of the present technology.
Figure 4B:
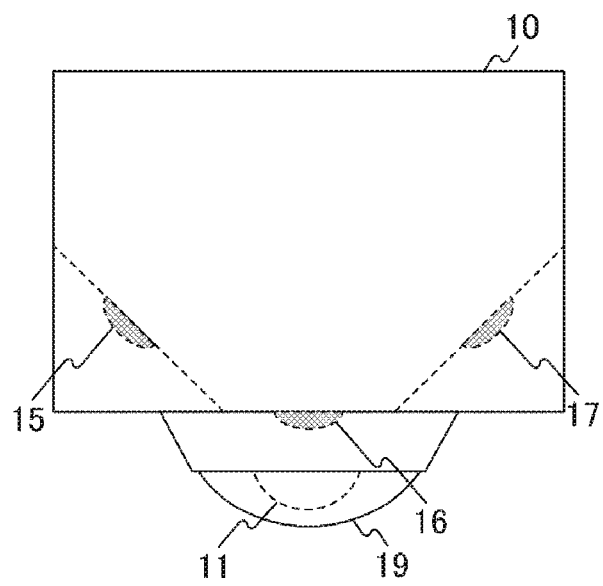

FIGS. 4A and 4B are schematic diagrams illustrating an example of the image pickup device 10 according to the embodiment of the present technology. Figures show the appearance of the image pickup device 10, where FIG. 4A represents a front view of the image pickup device 10, and FIG. 4B represents a top view of the image pickup device 10.

The fish-eye lens 11 is disposed in front of the image pickup device 10, and the image pickup element 12 is disposed behind the fish-eye lens 11 (not shown). Note that, in the figure, a protective cover 19 is disposed outside the fish-eye lens 11.

The microphones #1 (15) to #3 (17) are disposed below the fish-eye lens 11. The microphone #2 (16) is disposed in front of the image pickup device 10 similarly to the fish-eye lens 11. Each of the microphones #1 (15) and #3 (17) are disposed on a surface inclined by 45° with respect to the front. Therefore, the audio signals output from the microphones #1 (15) to #3 (17) are signals of phases different from each other. Note that the disposition of the microphones #1 (15) to #3 (17) is not limited to this example. For example, it is also possible to dispose the microphones #1 (15) to #3 (17) on an upper surface or a lower surface of the image pickup device 10. In this case, it is possible to dispose the microphones at vertex positions that form a triangle.

[Generation of Localization Audio Signal]

FIG. 5 is a diagram illustrating a relationship between the display area and the microphone according to the embodiment of the present technology. The figure shows the relationship between the display area and the microphones #1 (15) to #3 (17) of a case in which the position in the frame of the display area is changed. Display areas 402 to 404 are assumed that display areas are selected on a front left side, a front side, and a front right side of the image pickup device 10, respectively. As described above, even in a case in which the display area is largely changed, the audio signal for localizing the audio image in the display areas is generated by the localization audio signal generation unit 108.

The generation is able to be performed by a known method. For example, the generation is able to be performed by mixing the audio signals output from the microphones #1 (15) to #3 (17). The mixing is able to be performed, for example, on the basis of the following formula.

$$\text{Localization audio signal} = A \times M1 + B \times M2 + C \times M3$$

Here, M 1 to M 3 represent the audio signals output from the microphones #1 (15) to #3 (17), respectively. In addition, A, B, and C represent mixing coefficients. The localization audio signal generation unit 108 performs amplification of the audio signals output from the microphones #1 (15) to #3 (17). A gain at this time corresponds to the mixing coefficient. The localization audio signal generation unit 108 generates the localization audio signal by performing the mixing on the right channel and the left channel.

FIG. 6 is a diagram illustrating an example of the gain of the audio signal according to the embodiment of the present technology. The figure shows examples of values of A, B, and C corresponding to each display area described with reference to FIG. 5 for each channel. As described above, it is possible to generate the localization audio signal by adjusting the gain of the audio signals according to the position of the display area and mixing the audio signals.

[Localization Position]

Figure 7A:
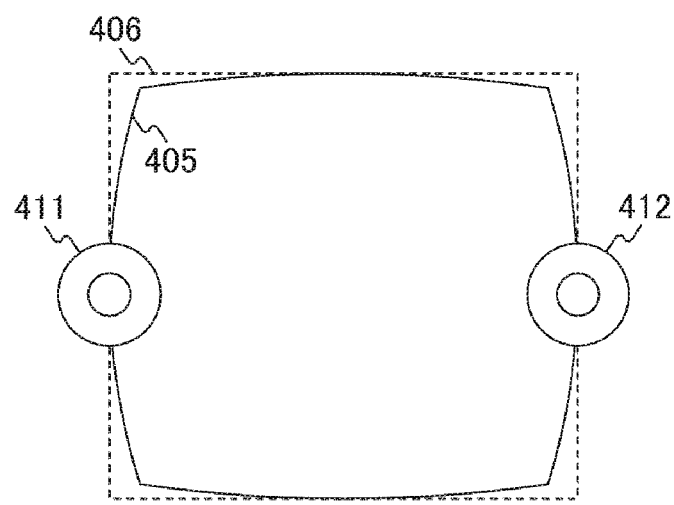
FIGS. 7A and 7B are diagrams illustrating an example of a localization position according to the embodiment of the present technology.
Figure 7B:
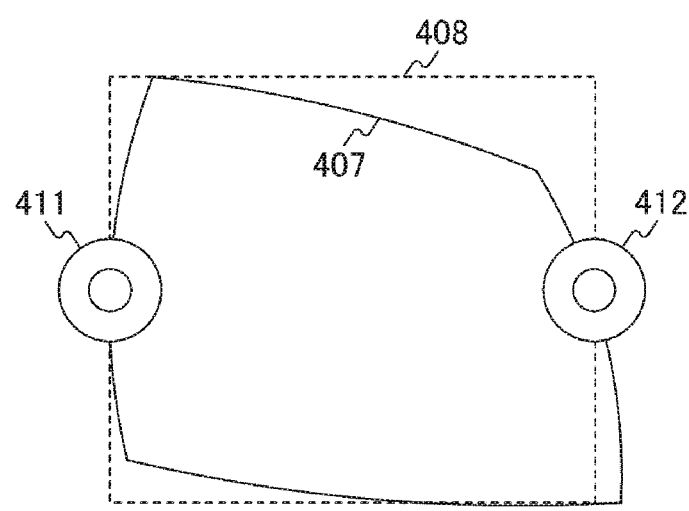

FIGS. 7A and 7B are diagrams illustrating an example of the localization position according to the embodiment of the present technology. Figures show a relationship between the display area and the localization position. FIG. 7A represents a case in which a display area 405 is selected at a central portion of the frame, and FIG. 7B represents a case in which a display area 407 is selected at an upper right of the frame. In addition, in the figure, virtual speakers 411 and 412 that output audios based on the localization audio signal are disposed. In this case, the audio image is localized between the speakers. The speakers 411 and 412 correspond to the right channel and the left channel, respectively, and the localization audio signal generation unit 108 generates the audio signal corresponding to the audios output from the speakers. Note that, areas 406 and 408 represented by dotted lines in the figure represent areas of the image signal of a case in which the distortion is corrected by the distortion correction unit 106. As described above, it is possible to set the localization position to a position obtained by dividing the display area into two in a vertical direction.

[Image Pickup Control Process]

Figure 8:
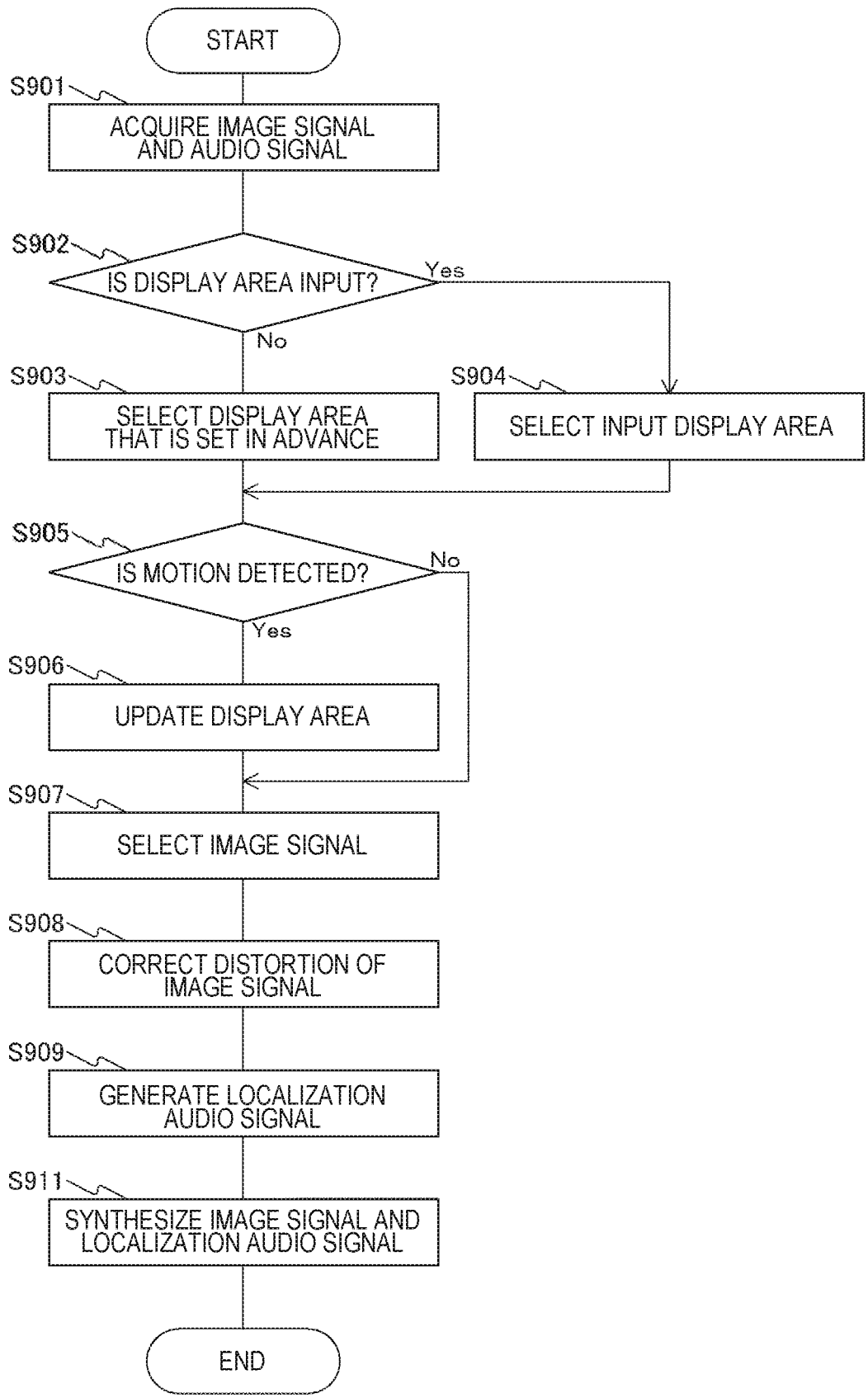
FIG. 8 is a diagram illustrating an example of a process procedure of an image pickup control process according to the embodiment of the present technology.

FIG. 8 is a diagram illustrating an example of a process procedure of an image pickup control process according to the embodiment of the present technology. First, the image pickup control unit 100 acquires the image signal and the audio signal (step S9010). Specifically, the image pickup control unit 100 causes the frame memory 104 to store the frame output from the image pickup element 12. At the same time, the image pickup control unit 100 acquires the audio signals output from the speakers #1 (15) to #3 (17). Next, the image pickup control unit 100 determines whether or not there is the input of the display area from the operation input unit 14 (step S902). In a case in which there is the input of the display area (step S902: Yes), the image pickup control unit 100 selects the input display area (step S904) and shifts to a process of step S905. On the other hand, in a case in which there is no input of the display area (step S902: No), the image pickup control unit 100 selects the display area that is set in advance (step S903) and shifts to the process of step S905.

In step S905, the image pickup control unit 100 determines whether or not the motion of the image pickup device 10 is detected (step S905). In a case in which the motion of the image pickup device 10 is detected (step S905: Yes), the image pickup control unit 100 updates the display area according to the detected motion of the image pickup element 12 (step S906) and shifts to a process of step S907. On the other hand, in a case in which the motion of the image pickup device 10 is not detected (step S905: No), the image pickup control unit 100 skips the process of step S906 and shifts to the process of step S907.

In step S907, the image pickup control unit 100 selects the image signal of the display area (step S907). This is because it is possible to read the image signal included in the display area from the image signal stored in the frame memory 104. Next, the image pickup control unit 100 corrects the distortion of the selected image signal (step S908). Next, the image pickup control unit 100 generates the localization audio signal which is the audio signal for localizing the audio image in the display area (step S909). Finally, the image pickup control unit 100 synthesizes the corrected image signal and the localization audio signal (step S911), and outputs the synthesized image signal and localization audio signal to the storage 18. Thereafter, the image pickup control unit 100 ends the image pickup control process.

As described above, in the first embodiment of the present technology, the position in the frame is updated according to the motion of the image pickup device 10, and the audio image is localized in the updated display area. Therefore, it is possible to simplify the configuration of the image pickup device 10.

2. Second Embodiment

In the first embodiment described above, the motion of the image pickup device 10 is detected by the gyro sensor 13, but the motion of the image pickup device 10 may be detected from the image signal output from the image pickup element 12. The second embodiment of the present technology is different from the first embodiment in that a motion vector is generated from the image signal output from the image pickup element 12 and the motion of the image pickup device 10 is detected.

[Configuration of Image Pickup Control Unit]

FIG. 9 is a diagram illustrating a configuration example of the image pickup control unit 100 according to the second embodiment of the present technology. The image pickup control unit 100 shown the figure is different from the image pickup control unit 100 described with reference to FIG. 2 in that a motion vector generation unit 112 is provided instead of the camera shake detection unit 102.

The motion vector generation unit 112 generates a motion vector from the frame output from the image pickup element 12. Here, the motion vector is information indicating a relative positional relationship of images between a plurality of time-series frames. In a case where the image pickup device 10 moves due to camera shake or the like, a frame in which the image moves in a direction opposite to the movement is output from the image pickup element 12. The motion vector generation unit 112 generates the motion vector from the motion of the image in the plurality of frames and outputs the motion vector to the display area update unit 103. In the generation of the motion vector, a known method is able to be used. Note that the motion vector generation unit 112 is an example of the motion detection unit described in the claims.

The display area update unit 103 in the figure detects the motion of the image pickup element 12 on the basis of the motion vector output by the motion vector generation unit 112.

In addition, in the image pickup device 10 according to the second embodiment of the present technology, the gyro sensor described with reference to FIG. 1 is able to be omitted.

Since the configuration of the image pickup device 10 other than this is similar to that of the image pickup device 10 described in the first embodiment of the present technology, the description thereof will be omitted.

As described above, according to the second embodiment of the present technology, it is possible to omit the gyro sensor 13 by generating the motion vector to detect the motion of the image pickup device 10, and it is possible to further simplify the configuration of the image pickup device 10.

3. Modified Example

In the above embodiment, the three microphones (microphone #1 (15) to #3 (17)) are used, but four microphones may be used. For example, a fourth microphone may be disposed above the fish-eye lens 11 of the image pickup device 10 described with reference to FIGS. 4A and 4B. Therefore, even in a case where the display area is selected above or below the frame, it is possible to generate the localization audio signal.

In addition, in a case in which a range in which the localization of the audio image is possible is limited to a range of 180° in front of the image pickup device 10, two microphones may be disposed. For example, in the image pickup device 10 described with reference to FIGS. 4A and 4B, the microphone #2 (16) may be omitted and the microphone #1 (15) and the microphone #3 (17) is able to be disposed in parallel with a surface on which the fish-eye lens 11 is disposed. Therefore, it is possible to simplify the configuration of the image pickup device 10.

As described above, in the embodiment of the present technology, the position of the display area in the frame is updated in accordance with the motion of the image pickup device 10, and the audio signal for localizing the audio image in the updated display area is generated and output from the audio signal output from the plurality of microphones disposed in the image pickup device 10. Therefore, it is possible to simplify the configuration of the image pickup device 10.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described in this specification are construed as merely illustrative and not limitative, and other effects may be achieved.

Additionally, the present technology may also be configured as below.

(1)

An image pickup control device including:

a display area update unit configured to update a position in a frame of a display area which is an area used for display among frames including an image signal output from an image pickup element in accordance with a motion of an image pickup device in which the image pickup element is disposed; and a localization audio signal generation unit configured to generate a localization audio signal which is an audio signal for localizing an audio image in the updated display area on the basis of audio signals output from a plurality of microphones.

(2)

The image pickup control device according to (1), in which the localization audio signal generation unit generates the localization audio signal by mixing the audio signals output from the plurality of microphones.

(3)

The image pickup control device according to (1) or (2), further including:

a correction unit configured to correct a distortion of the image signal in the corrected display area.

(4)

The image pickup control device according to (3) in which the image pickup element outputs the image signal captured through a fish-eye lens, and the correction unit corrects the distortion of the image signal by the fish-eye lens.

(5)

The image pickup control device according to any of (1) to (4), further including:

a motion detection unit configured to detect the motion of the image pickup device, in which the display area update unit updates the display area in accordance with the motion of the image pickup device detected by the motion detection unit.

(6)

The image pickup control device according to (5) in which the motion detection unit detects the motion of the image pickup device on the basis of an output from a sensor that detects the motion of the image pickup device.

(7)

The image pickup control device according to (5), in which the motion detection unit detects the motion of the image pickup device on the basis of a motion vector generated from the image signal output from the image pickup device.

(8)

An image pickup device including:

an image pickup element;

a display area update unit configured to update a position in a frame of a display area which is an area used for display among frames including an image signal output from the image pickup element in accordance with a motion of the image pickup device in which the image pickup element is disposed; and a localization audio signal generation unit configured to generate a localization audio signal which is an audio signal for localizing an audio image in the updated display area on the basis of audio signals output from a plurality of microphones.

(9)

An image pickup control method including:

a display area update procedure of updating a position in a frame of a display area which is an area used for display among frames including an image signal output from an image pickup element in accordance with a motion of an image pickup device in which the image pickup element is disposed; and a localization audio signal generation procedure of generating a localization audio signal which is an audio signal for localizing an audio image in the updated display area on the basis of audio signals output from a plurality of microphones.

REFERENCE SIGNS LIST 10 image pickup device
11 fish-eye lens
12 image pickup element
13 gyro sensor
14 operation input unit
15 to 17 microphone
18 storage
19 protective cover
100 image pickup control unit
101 display area selection unit
102 camera shake detection unit
103 display area update unit
104 frame memory
105 image signal selection unit
106 distortion correction unit
107 audio signal processing unit
108 localization audio signal generation unit
109 synthesis unit
112 motion vector generation unit

The invention claimed is:

1. An image pickup control device, comprising:
circuitry configured to:
receive a plurality of frames from an image pickup element of an image pickup device, wherein each frame of the plurality of frames corresponds to an image signal;
control selection of a display area of a frame of the plurality of frames;
detect a motion of the image pickup device;
update a position of the selected display area in the frame based on the detected motion of the image pickup device;
receive a plurality of audio signals from a plurality of microphones;
change a shape of the selected display area based on the detected motion of the image pickup device;
select the image signal corresponding to one frame of the plurality of frames, wherein the image signal is selected based on the update of the position of the selected display area and the change in the shape of the selected display area;
adjust a gain of each audio signal of the received plurality of audio signals based on the position of the display area in the frame;
execute a mixing process to mix the plurality of audio signals, wherein the execution of the mixing process is based on the adjusted gain;
generate a localization audio signal based on the execution of the mixing process of the plurality of audio signals, wherein the localization audio signal is for localization of an audio image in the updated display area; and
synthesize the selected image signal and the localization audio signal.

2. The image pickup control device according to claim 1, wherein the circuitry is further configured to correct a distortion of the image signal of the updated display area.

3. The image pickup control device according to claim 2, wherein the image pickup element captures the image signal of the updated display area by a fish-eye lens.

4. The image pickup control device according to claim 1, wherein the circuitry is further configured to:
receive motion information of the image pickup device from a sensor; and
detect the motion of the image pickup device based on the received motion information.

5. The image pickup control device according to claim 1, wherein the circuitry is further configured to:
receive the image signal from the image pickup device;
generate a motion vector based on the received image signal; and
detect the motion of the image pickup device based on the generated motion vector.

6. An image pickup device, comprising:
an image pickup element configured to output a plurality of frames, wherein each frame of the plurality of frames corresponds to an image signal; and
circuitry configured to:
receive the plurality of frames from the image pickup element;
control selection of a display area of a frame of the plurality of frames;
detect a motion of the image pickup device;
update a position of the selected display area in the frame based on the detected motion of the image pickup device;
receive a plurality of audio signals from a plurality of microphones;
change a shape of the selected display area based on the detected motion of the image pickup device;
select the image signal corresponding to one frame of the plurality of frames, wherein the image signal is selected based on the update of the position of the selected display area and the change in the shape of the selected display area;
adjust a gain of each audio signal of the received plurality of audio signals based on the position of the display area in the frame;
execute a mixing process to mix the plurality of audio signals, wherein the execution of the mixing process is based on the adjusted gain;
generate a localization audio signal based on the execution of the mixing process of the plurality of audio signals, wherein the localization audio signal is for localization of an audio image in the updated display area; and
synthesize the selected image signal and the localization audio signal.

7. An image pickup control method, comprising:
receiving a plurality of frames from an image pickup element of an image pickup device, wherein each frame of the plurality of frames corresponds to an image signal;
controlling selection of a display area of a frame of the plurality of frames;
detecting a motion of the image pickup device;
updating a position of the selected display area in the frame based on the detected motion of the image pickup device;
receiving a plurality of audio signals from a plurality of microphones;
changing a shape of the selected display area based on the detected motion of the image pickup device;
selecting the image signal corresponding to one frame of the plurality of frames, wherein the image signal is selected based on the update of the position of the selected display area and the change in the shape of the selected display area;
adjusting a gain of each audio signal of the received plurality of audio signals based on the position of the display area in the frame;
executing a mixing process to mix the plurality of audio signals, wherein the execution of the mixing process is based on the adjusted gain;
generating a localization audio signal based on the execution of the mixing process of the plurality of audio signals, wherein the localization audio signal is for localization of an audio image in the updated display area; and
synthesizing the selected image signal and the localization audio signal.

* * * * *